(12) United States Patent
Kou et al.

(10) Patent No.: US 10,124,805 B2
(45) Date of Patent: Nov. 13, 2018

(54) WORK VEHICLE AND CONTROL METHOD FOR WORK VEHICLE

(71) Applicant: Komatsu Ltd., Tokyo (JP)

(72) Inventors: Ryuuen Kou, Hiratsuka (JP); Akiharu Nishijima, Hiratsuka (JP); Shinya Kondou, Hitachinaka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/329,008

(22) PCT Filed: Jul. 31, 2014

(86) PCT No.: PCT/JP2014/070268
§ 371 (c)(1),
(2) Date: Jan. 25, 2017

(87) PCT Pub. No.: WO2016/017014
PCT Pub. Date: Feb. 4, 2016

(65) Prior Publication Data
US 2017/0210386 A1      Jul. 27, 2017

(51) Int. Cl.
*B60W 30/18*      (2012.01)
*B60T 7/12*        (2006.01)
(Continued)

(52) U.S. Cl.
CPC ....... *B60W 30/18172* (2013.01); *B60K 17/35* (2013.01); *B60K 28/16* (2013.01);
(Continued)

(58) Field of Classification Search
CPC ... B60K 28/16; B60P 3/00; B60T 7/12; B60T 8/175; B60W 10/06; B60W 10/18;
(Continued)

(56) References Cited

U.S. PATENT DOCUMENTS

| | | | | |
|---|---|---|---|---|
| 4,946,015 A | * | 8/1990 | Browalski | B60T 8/175 180/197 |
| 4,998,782 A | * | 3/1991 | Thatcher | B60T 8/175 180/197 |

(Continued)

FOREIGN PATENT DOCUMENTS

| | | |
|---|---|---|
| CN | 102171083 A | 8/2011 |
| JP | S63192928 A | 8/1988 |

(Continued)

OTHER PUBLICATIONS

International Search Report dated Oct. 14, 2014, issued for PCT/JP2014/070268.
(Continued)

*Primary Examiner* — Tyler J Lee
(74) *Attorney, Agent, or Firm* — Locke Lord LLP

(57) ABSTRACT

A work vehicle includes: an engine; a plurality of drive wheels driven by the engine; and an operation controller executes first drive force control that brakes a slipping drive wheel out of the plurality of drive wheels and executes second drive force control that reduces output of the engine in accordance with the slip ratio of the slipping drive wheel during execution of the first drive force control.

6 Claims, 8 Drawing Sheets

(51) Int. Cl.
| | |
|---|---|
| *B60T 8/175* | (2006.01) |
| *G08G 1/16* | (2006.01) |
| *B60W 10/18* | (2012.01) |
| *B60W 30/02* | (2012.01) |
| *B60W 30/188* | (2012.01) |
| *B60P 3/00* | (2006.01) |
| *B60K 28/16* | (2006.01) |
| *B60W 10/06* | (2006.01) |
| *B60K 17/35* | (2006.01) |
| *B60T 7/18* | (2006.01) |
| *B60T 8/174* | (2006.01) |
| *B60W 30/00* | (2006.01) |
| *G01S 13/93* | (2006.01) |
| *G08G 1/0967* | (2006.01) |
| *G08G 1/00* | (2006.01) |

(52) U.S. Cl.
CPC ............ *B60P 3/00* (2013.01); *B60T 7/12* (2013.01); *B60T 7/18* (2013.01); *B60T 8/174* (2013.01); *B60T 8/175* (2013.01); *B60W 10/06* (2013.01); *B60W 10/18* (2013.01); *B60W 30/00* (2013.01); *B60W 30/02* (2013.01); *B60W 30/188* (2013.01); *G01S 13/931* (2013.01); *G08G 1/096725* (2013.01); *G08G 1/096741* (2013.01); *G08G 1/096775* (2013.01); *G08G 1/16* (2013.01); *G08G 1/165* (2013.01); *G08G 1/166* (2013.01); *G08G 1/20* (2013.01); *B60W 2300/125* (2013.01); *B60W 2300/17* (2013.01); *B60W 2520/10* (2013.01); *B60W 2520/26* (2013.01); *B60W 2520/263* (2013.01); *B60W 2520/28* (2013.01); *B60W 2550/40* (2013.01); *B60W 2710/06* (2013.01); *B60W 2710/0666* (2013.01); *B60W 2710/18* (2013.01); *B60W 2710/182* (2013.01); *H05K 999/99* (2013.01)

(58) Field of Classification Search
CPC ....... B60W 2300/125; B60W 2520/10; B60W 2520/26; B60W 2520/28; B60W 2710/06; B60W 2710/182; B60W 30/02; B60W 30/18172; B60W 30/188; G08G 1/16
USPC ...................................................... 701/2, 50
See application file for complete search history.

(56) References Cited

U.S. PATENT DOCUMENTS

| | | | | |
|---|---|---|---|---|
| 5,014,202 | A * | 5/1991 | Thatcher | B60T 8/175 180/197 |
| 5,073,865 | A * | 12/1991 | Togai | B60K 28/16 180/197 |
| 5,117,934 | A * | 6/1992 | Tsuyama | B60T 8/172 180/197 |
| 5,275,474 | A * | 1/1994 | Chin | B60K 28/16 303/148 |
| 5,297,662 | A * | 3/1994 | Tsuyama | B60K 28/16 180/197 |
| 5,353,225 | A * | 10/1994 | Tsuyama | B60T 8/175 180/197 |
| 5,803,197 | A * | 9/1998 | Hara | B60K 23/0808 180/248 |
| 5,944,392 | A * | 8/1999 | Tachihata | B60T 8/172 303/112 |
| 5,978,726 | A * | 11/1999 | Takeda | B60T 8/48 180/197 |
| 8,352,145 | B2 | 1/2013 | Uematsu et al. | |
| 8,463,511 | B2 | 6/2013 | Uematsu et al. | |
| 8,725,359 | B2 | 5/2014 | Uematsu et al. | |
| 8,725,360 | B2 * | 5/2014 | Uematsu | B60K 17/35 701/50 |
| 9,145,127 | B2 | 9/2015 | Uematsu et al. | |
| 2011/0246031 | A1 | 10/2011 | Uematsu et al. | |
| 2011/0251762 | A1 | 10/2011 | Uematsu et al. | |
| 2011/0257851 | A1 | 10/2011 | Uematsu et al. | |
| 2011/0257861 | A1 | 10/2011 | Uematsu et al. | |
| 2011/0270497 | A1 * | 11/2011 | Uematsu | B60T 8/175 701/50 |
| 2012/0041651 | A1 | 2/2012 | Uematsu et al. | |
| 2014/0358382 | A1 | 12/2014 | Kau et al. | |

FOREIGN PATENT DOCUMENTS

| | | |
|---|---|---|
| JP | 08-014075 A | 1/1996 |
| JP | 2003-074690 A | 3/2003 |
| JP | 3791625 B2 | 6/2006 |
| JP | 3893920 B2 | 3/2007 |
| WO | 2010/074225 A1 | 7/2010 |
| WO | 2013/136588 A1 | 9/2013 |

OTHER PUBLICATIONS

Office Action dated on Mar. 7, 2018 issued for corresponding Australian Patent Application No. 2014402646.

* cited by examiner

WORK VEHICLE AND CONTROL METHOD FOR WORK VEHICLE

FIELD

The present invention relates to a work vehicle and a control method for the work vehicle.

BACKGROUND

In a work vehicle provided with a mechanical travel device that travels by transmitting power generated by an engine to a drive wheel via a transmission, control that reduces drive force of an idling drive wheel is executed in order to improve travel performance. Such control is called traction control. In Patent Literature 1, disclosed is a technology in which traction control is achieved by reducing drive force of a drive wheel by using a brake.

CITATION LIST

Patent Literature

Patent Literature 1: WO 2010/074225

SUMMARY

Technical Problem

In the case of making a mechanical work vehicle travel, a drive wheel may not recover from slipping despite actuation of traction control by using a brake.

The present invention is directed to making the drive wheel recover from slipping and allowing the mechanical work vehicle to continue traveling.

Solution to Problem

According to the present invention, a work vehicle comprises: an engine; a plurality of drive wheels driven by the engine; and an operation controller configured to execute first drive force control that brakes a slipping drive wheel out of the plurality of drive wheels and also configured to execute second drive force control that reduces output of the engine in accordance with a slip ratio of the slipping drive wheel during execution of the first drive force control.

It is preferable that the operation controller executes the second drive force control in a case where an actual vehicle speed of the work vehicle is less than a first vehicle speed threshold and also a speed difference between the drive wheel and a driven wheel included in the work vehicle is continuously kept at a speed difference threshold or more.

It is preferable that the operation controller finishes the second drive force control currently executed in a case where the first drive force control is finished or the actual vehicle speed of the work vehicle is equal to or more than a second vehicle speed threshed that is larger than the first vehicle speed threshold during execution of the second drive force control.

It is preferable that the work vehicle further comprises a communication device configured to communicate with outside of the work vehicle, wherein the operation controller obtains a target vehicle speed of the work vehicle from the communication device, performs control such that the actual vehicle speed of the work vehicle becomes the target vehicle speed, and at a time of performing the second drive force control, subtracts a correction accelerator position acquired in accordance with a slip ratio of the slipping drive wheel from a target accelerator position of an accelerator acquired in accordance with the target vehicle speed and the actual vehicle speed, the accelerator adjusting output of the engine.

According to the present invention, a work vehicle including an engine and a plurality of drive wheels driven by the engine, comprises: a communication device configured to communicate with outside of the work vehicle; and an operation controller configured to obtain a target vehicle speed of the work vehicle from the communication device and perform control such that an actual vehicle speed of the work vehicle becomes the target vehicle speed, wherein the operation controller executes first drive force control that brakes a slipping drive wheel out of the plurality of drive wheels such that a slip ratio of the slipping drive wheel becomes a target value of the slip ratio of the drive wheel, and further executes second drive force control that reduces output of the engine in accordance with the slip ratio of the slipping drive wheel during execution of the first drive force control.

According to the present invention, a control method for a work vehicle including an engine and a plurality of drive wheels driven by the engine, comprises: acquiring slip ratios of the plurality of drive wheels; executing drive force control that brakes a slipping drive wheel out of the plurality of drive wheels; reducing output of the engine in accordance with a slip ratio of the slipping drive wheel in a case where a vehicle speed of the work vehicle is less than a vehicle speed threshold and a speed difference between the drive wheel and a driven wheel included in the work vehicle is continuously kept at a speed difference threshold or more during execution of the drive force control.

The present invention makes the drive wheel to recover from slipping and enables a mechanical work vehicle to continue traveling.

BRIEF DESCRIPTION OF DRAWINGS

FIG. 5-1 is a diagram illustrating a relation between a slip ratio SR and friction force.

FIG. 5-2 is a diagram illustrating a rear wheel that is a drive wheel and a road surface where the rear wheel contacts.

DESCRIPTION OF EMBODIMENTS

A mode (embodiment) to implement the present invention will be described with reference to the drawings.

Figure 1:
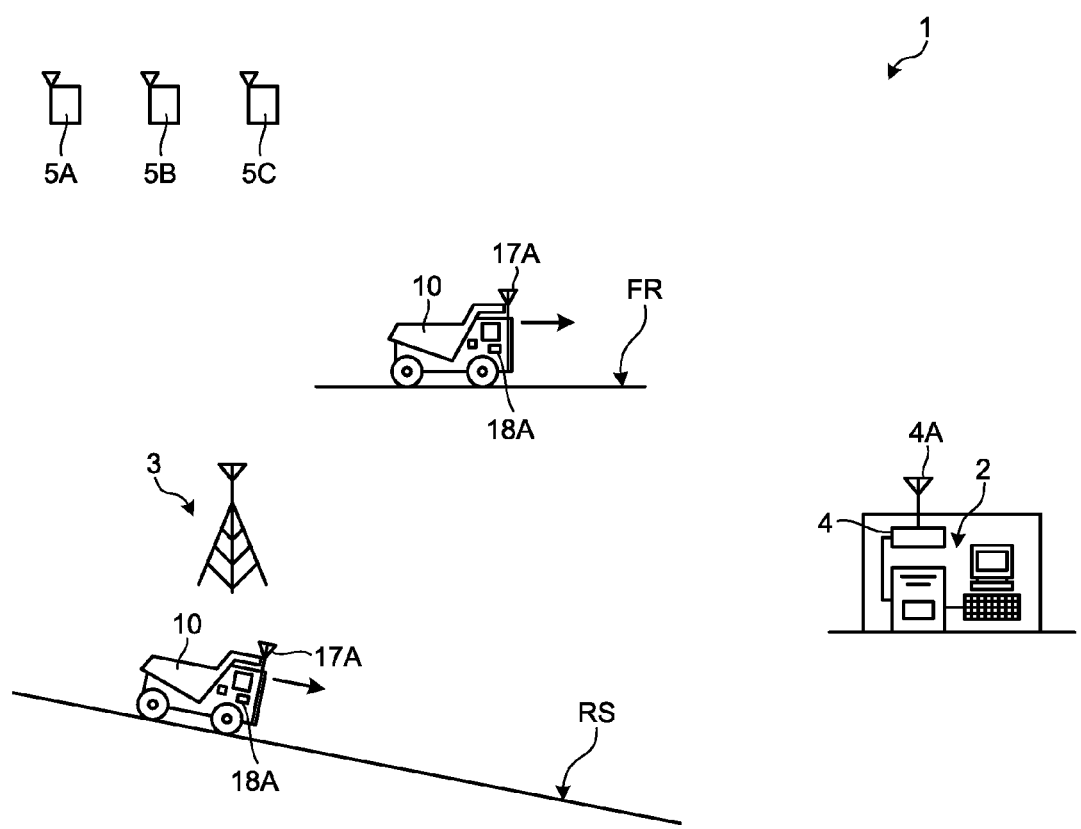
FIG. 1 is a diagram illustrating a site where a work vehicle according to the present embodiment works.

FIG. 1 is a diagram illustrating a site where a work vehicle according to the present embodiment works. The work vehicle of the present embodiment is used for various kinds of works in a mine, but the work vehicle is not limited to the one used in a mine. In the present embodiment, exemplified as a work vehicle is a dump truck 10 provided as a transportation vehicle to transport crushed stones, or soils, rocks, and the like generated at the time of excavating crushed stones, but the work vehicle is not limited thereto. For example, the work vehicle according to the present embodiment may be a wheel loader and the like. The work vehicle may be an autonomous travel vehicle that generates an own travel route by itself and travels.

<Dump Truck in Mine>

In the present embodiment, the dump truck 10 is controlled by an unmanned dump operation system 1 and automatically travels. In the unmanned dump operation system 1, an operation management device 2 transmits, to the dump truck 10, necessary information for automatic operation, such as a destination of the dump truck 10, a travel permission per zone, positional information of other vehicles, and an emergency stop command. The dump truck 10 automatically travels based on the information necessary for automatic operation obtained from the operation management device 2. Different from the dump truck 10 that is a movable body, the operation management device 2 is a kind of a management device installed in, for example, a management facility in a mine and adapted to manage a work vehicle like the dump truck 10, administration of the mine, and so on.

The operation management device 2 is connected to a radio communication device 4 including an antenna 4A in order to make the dump truck 10 that works in the mine travel. The dump truck 10 includes an antenna 17A in order to receive a command from the operation management device 2 and transmit own work information to the operation management device 2. Besides, the dump truck 10 receives radio waves from a global positioning system (GPS) satellites 5A, 5B, 5C by a GPS antenna 18A and can perform positioning for an own position.

Output of radio waves transmitted by the antenna 4A of the operation management device 2 and the antenna 17A of the dump truck 10 is not in a communicable range that can cover an entire area of the mine. Therefore, the unmanned dump operation system 1 includes a repeater 3 that relays the radio waves transmitted by the antenna 4A and the antenna 17A. The operation management device 2 can transmit, via the repeater 3, a command for controlling the dump truck 10 that is working at a position distant from the own position of the operation management device, and also can collect the work information from the dump truck 10. In the mine, the dump truck 10 travels on a flat road FR and also travels on a sloping road RS at the time of traveling between a soil unloading place and a loading place. Next, the dump truck 10 will be described.

<Dump Truck 10>

Figure 2:
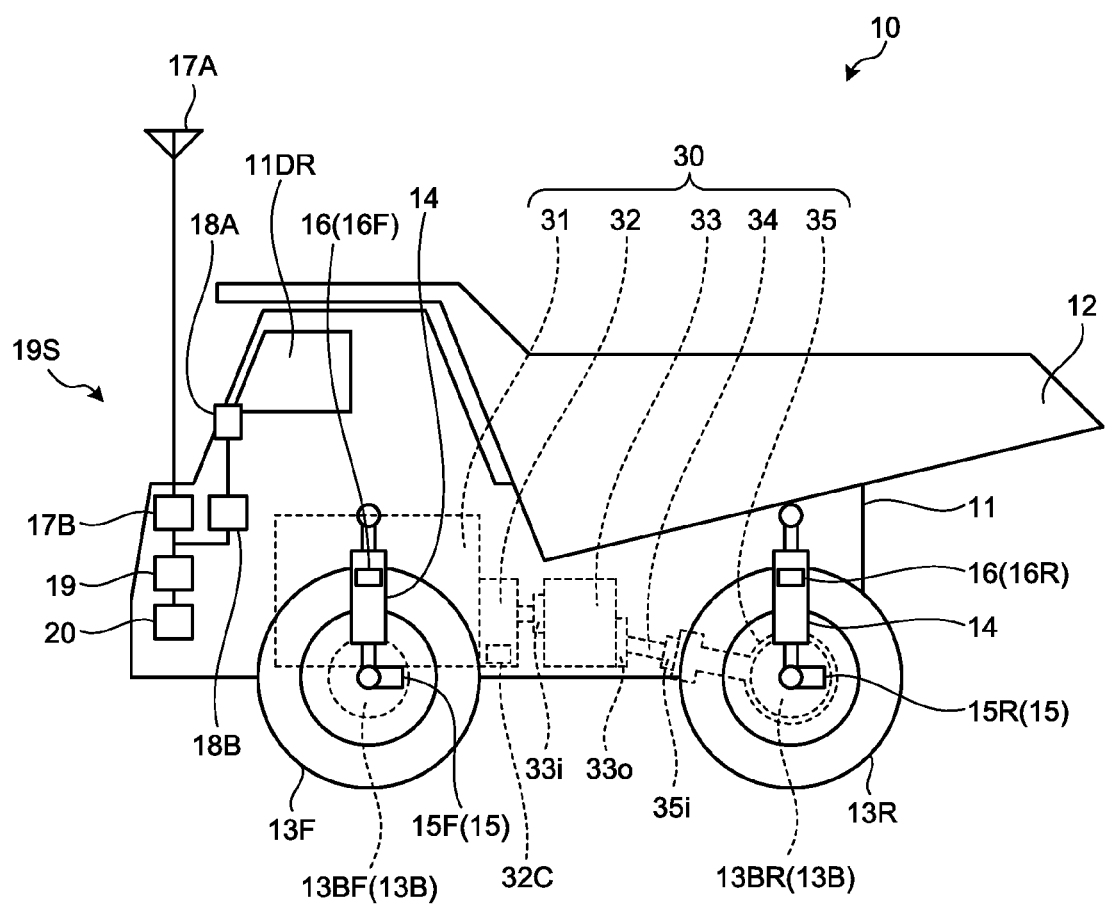
FIG. 2 is a diagram illustrating a dump truck according to the present embodiment.

FIG. 2 is a diagram illustrating the dump truck 10 according to the present embodiment. The dump truck 10 is controlled by the unmanned dump operation system 1 and automatically works even without operation by an operator. However, in the case where the dump truck 10 is delivered to a maintenance factory or in the case where the dump truck 10 is carried out from the maintenance factory, control of the dump truck 10 by the unmanned dump operation system 1 may not be executed. In this case, an operator needs to ride in the dump truck 10 and operate the dump truck 10. Therefore, the dump truck 10 includes an operating room 11DR in which the operator rides, and the operating room 11DR includes operating devices such as a steering wheel, an accelerator pedal, and a brake pedal.

The dump truck 10 loads matters to be loaded and unloads the loaded matters at a desired place. The dump truck 10 includes: a vehicle body 11; a vessel 12; front wheels 13F; rear wheels 13R; a brake 13B as a braking device; a suspension cylinder 14; a rotation sensor 15; a suspension pressure sensor (pressure sensor) 16; an in-vehicle radio communication device 17B connected to the antenna 17A; a GPS receiver 18B as a positional information detection device connected to the GPS antenna 18A; a communication controller 19; a control system 20; and a drive device 30. Meanwhile, the dump truck 10 is provided with various kinds of mechanisms and functions included in a general carrier or transportation vehicle in addition to above-described equipment. In the present embodiment, illustrated is a rigid type dump truck 10 in which steering is performed by the front wheels 13F, but instead of such an dump truck 10, the present embodiment may also be applicable to an articulate type dump truck in which a vehicle body is divided into a front portion and a rear portion and these portions are joined by a free joint.

The vehicle body 11 includes the vessel 12, front wheels 13F, rear wheels 13R, suspension cylinder 14, drive device 30, and the like. The vessel 12 functions as a loading platform to load minerals, soils, and the like as the loaded matters. The vessel 12 is disposed at an upper portion of the vehicle body 11. The front wheels 13F are steering wheels to define a moving direction of the dump truck 10. The rear wheels 13R are drive wheels that makes the dump truck 10 travel. The front wheels 13F are disposed on a front side of the vehicle body 11, namely, both right and left sides of the operating room 11DR side. The rear wheels 13R are disposed on a rear side of the vehicle body 11, namely, both right and left sides on the opposite side of the operating room 11DR.

The brake 13B is to include a front wheel brake 13BF and a rear wheel brake 13BR. The front wheel brake 13BF is provided at each of the front wheels 13F and brakes these front wheels. The rear wheel brake 13BR is provided at each of the rear wheels 13R and brakes these rear wheels.

The suspension cylinders 14 are provided in between the vehicle body 11 and the right and left front wheels 13F and between the vehicle body 11 and the right and left rear wheels 13R respectively. The suspension cylinders 14 are installed at the right and left front wheels 13F and the right and left rear wheels 13R respectively and adapted to support these wheels. To the suspension cylinders 14, not only loads of the vehicle body 11 and the vessel 12 but also a load corresponding to mass of loaded matters at the time of loading the loaded matters are applied. Hydraulic oil is sealed inside the suspension cylinder 14, and extends/contracts in accordance with the mass of the loaded matters.

The rotation sensor 15 is to include a front wheel side rotation sensor 15F adapted to detect an engine speed of each front wheel 13F, and a rear wheel side rotation sensor 15R adapted to detect an engine speed of each rear wheels 13R. For example, the front wheel side rotation sensor 15F detects a rotation speed of the front wheel 13F, thereby the rotation sensor 15 measuring a traveling speed of the dump truck 10 (suitably referred to as vehicle speed). The rotation sensor 15 may be, for example, a pulse sensor. The front wheel 13F is a driven wheel not driven by the drive device 30. While the dump truck 10 is driven and traveling, namely, while the rear wheels 13R are driven by the drive device 30 and the dump truck 10 is traveling, the front wheel 13F is not driven by the drive device 30. Therefore, slipping does not substantially occur with the road surface. Accordingly, the rotation speed of the front wheel 13F substantially corresponds to the vehicle speed of the dump truck 10.

The suspension pressure sensors 16 are provided at the respective corresponding suspension cylinders 14 installed at the front wheels 13F and the rear wheels 13R respectively. The suspension pressure sensor 16 detects a load applied to each of the suspension cylinders 14. Specifically, the suspension pressure sensor 16 can measure mass of loaded matters (loaded amount) by detecting pressure of the hydraulic oil sealed in the suspension cylinder 14.

A communication device 19S includes the antenna 17A, in-vehicle radio communication device 17B, GPS antenna 18A, and GPS receiver 18B, and communication controller 19. The antenna 17A receives radio waves output from the repeater 3 of the operation management device 2 illustrated in FIG. 1. The antenna 17A outputs the received radio waves to the in-vehicle radio communication device 17B. The in-vehicle radio communication device 17B performs radio communication via the antenna 17A, repeater 3, and antenna 4A of the operation management device 2.

The GPS antenna 18A receives radio waves output from the plurality of GPS satellites 5A, 5B, 5C constituting the global positioning system (GPS) and illustrated in FIG. 1. The GPS antenna 18A outputs the received radio waves to the GPS receiver 18B. The GPS receiver 18B converts the radio waves received by the GPS antenna 18A to an electric signal, and calculates positional information of the GPS antenna 18A, namely, the positional information of the dump truck 10. Thus, the GPS receiver 18B performs positioning for the position of the dump truck 10.

The in-vehicle radio communication device 17B and the GPS receiver 18B are connected to the communication controller 19. The communication controller 19 is connected to the control system 20. The communication controller 19 converts the information from the in-vehicle radio communication device 17B and the GPS receiver 18B to a format understandable by the control system 20. The control system 20 obtains, from the operation management device 2, information in order to drive the dump truck 10 in an unmanned state via the communication controller 19, in-vehicle radio communication device 17B, and antenna 17A. Additionally, the control system 20 obtains the positional information of the dump truck 10 from the GPS receiver 18B.

(Drive Device 30)

The drive device 30 drives the rear wheels 13R and makes the dump truck 10 travel. The drive device 30 includes an engine 31 as a power generation source, a torque converter 32, a gear box 33, a propeller shaft 34, and a differential gear 35. The engine 31 is a diesel engine in the present embodiment, but not limited to the diesel engine. Output of the engine 31 is transmitted to the gear box 33 via the torque converter 32. The torque converter 32 includes: an input shaft adapted to receive output of the engine 31; and an output shaft adapted to output the output of the engine received in the input shaft. The torque converter 32 includes a lock-up clutch 32C that directly connects the input shaft to the output shaft. The gear box 33 reduces a rotation speed (engine speed per unit time) of a crankshaft that is the output shaft of the engine 31, increases torque, and outputs the same to the propeller shaft 34.

The propeller shaft 34 connects an output unit 33o of the gear box 33 to an input unit 35i of the differential gear 35. The propeller shaft 34 transmits output of the gear box 33 to the differential gear 35. The differential gear 35 transmits the transmitted output from the gear box 33 to the right and left rear wheels 13R and drives these wheels. Thus, the drive device 30 makes the dump truck 10 travel.

(Gear Box 33)

The gear box 33 can perform output from the output unit 33o by varying the rotation speed of the engine 31 received from an input unit 33i, namely, by changing the gear. In the present embodiment, the gear box 33 is, for example, a power transmission device in which a plurality of planetary gear mechanisms adapted to transmit power from the engine 31 is combined with a plurality of clutches and a plurality of brakes to select a rotary element included in each of the planetary gear mechanisms. The gear box 33 can achieve a plurality of different transmission gear ratios by switching the rotary element where the power of the engine 31 passes by engaging or releasing the above-described clutch and brake. Thus, in the present embodiment, the dump truck 10 is a mechanical vehicle that travels by transmitting, to the rear wheels 13R, the power generated by the engine 31 via the torque converter 32, gear box 33, propeller shaft 34, and differential gear 35.

<Control System 20>

Figure 3:
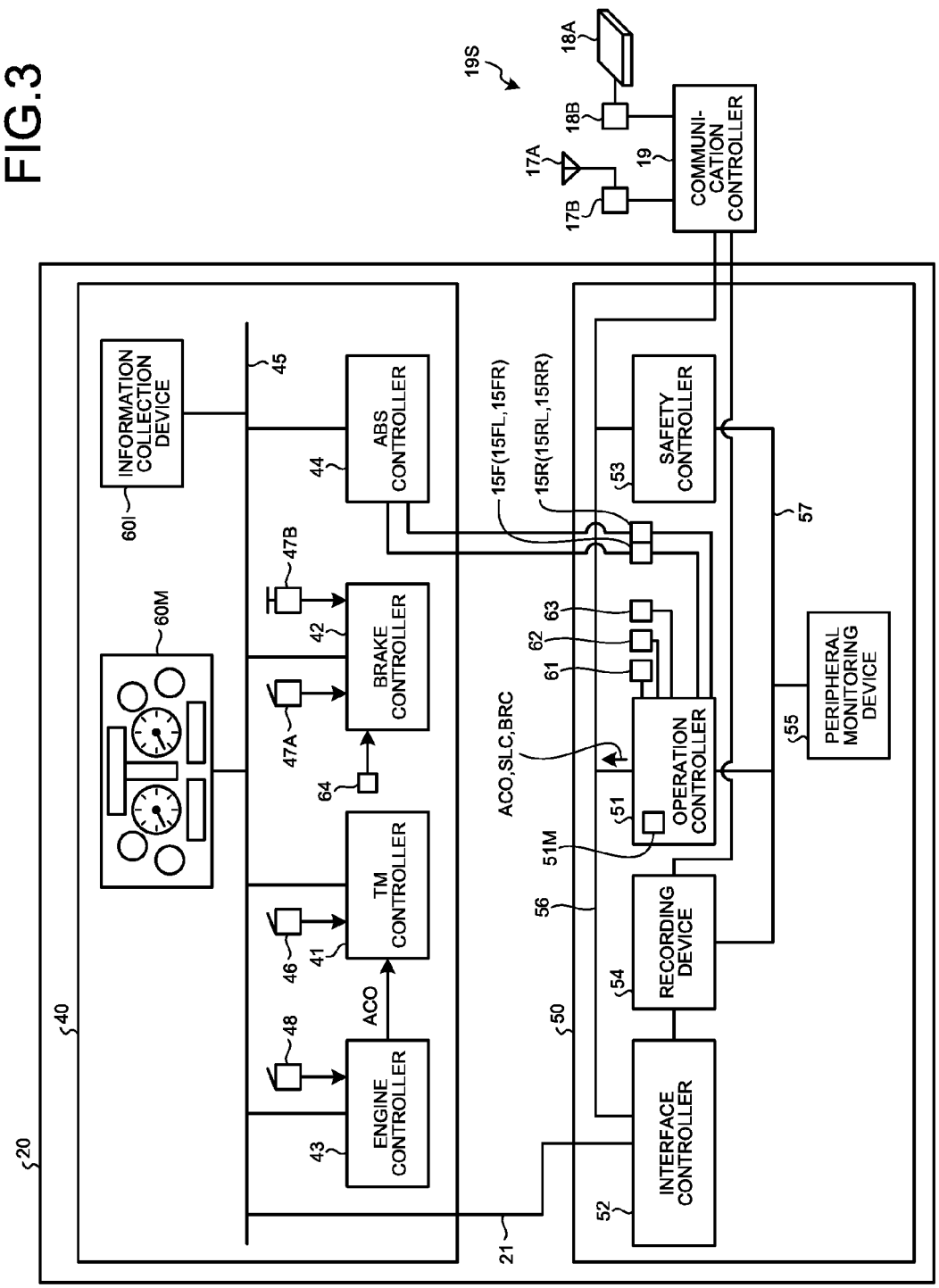
FIG. 3 is a block diagram illustrating a control system included in the dump truck.

FIG. 3 is a block diagram illustrating the control system 20 included in the dump truck 10. The control system 20 includes a first control system 40 and a second control system 50. The first control system 40 controls the equipment such as the engine 31, gear box 33, and brake 13B mounted on the dump truck 10. The first control system 40 makes the dump truck 10 travel based on operation by an operator riding in the dump truck 10. The second control system 50 generates a control command to control the dump truck 10 based on a command from the operation management device 2 illustrated in FIG. 1 and information obtained from the communication device 19S. The second control system 50 transmits the generated control command to the first control system 40 and makes the dump truck 10 automatically travel in an manned state via the first control system 40.

In the present embodiment, an operation mode in which the dump truck travels by operation of the operator riding in the dump truck 10 is referred to as a first operation mode. An operation mode in which the dump truck 10 travels without the operator riding in the dump truck 10, for example, the dump truck 10 travels based on information from the outside of the dump truck 10 is referred to as a second operation mode. The first operation mode is the operation mode in which the dump truck 10 travels in a manned state, and the second operation mode is the operation mode in which the dump truck 10 travels in an unmanned state.

(First Control System 40)

The first control system 40 includes, for example, a transmission (TM) controller 41, a brake controller 42, an engine controller 43, an antilock brake system (ABS) controller 44, a monitor 60M, and an information collection device 60I. The TM controller 41, brake controller 42, engine controller 43, ABS controller 44, monitor 60M, and information collection device 60I are computers each including: a processing unit having a central processing unit (CPU) and the like; and a storage unit such as a read only memory (ROM), for example.

The TM controller 41 controls the gear box 33 and the lock-up clutch 32C of the torque converter 32 illustrated in FIG. 2. The brake controller 42 controls the brake 13B illustrated in FIG. 2. The engine controller 43 controls the engine 31 illustrated in FIG. 2. In the case where the front wheels 13F and the rear wheels 13R are locked when the brake 13B illustrated in FIG. 2 brakes these wheels, the ABS controller 44 reduces brake force of the brake 13B and releases the locked front wheels 13F and rear wheels 13R.

The information collection device 60I obtains information related to a state of the dump truck 10 from the TM controller 41, brake controller 42, engine controller 43, ABS controller 44, and various kinds of sensors while the dump truck 10 is working, and stores the information correlated to time of obtaining the information. The information in which the state of the dump truck 10 and the information correlated to the time of obtaining the information will be referred to as the work information. The information collection device 60I transmits the work information of the dump truck 10 to the operation management device 2 illustrated in FIG. 1 via the communication device 19S. The operation management device 2 creates a daily report by using the work information obtained from the information collection device 60I and detects malfunction and the like of the dump truck 10, for example. In the present embodiment, the in-vehicle radio communication device may be directly connected to the information collection device 61I, and the information collection device 61I may also transmit the work information to the operation management device 2 not from the communication device 19S but via the in-vehicle radio communication device.

The monitor 60M displays various kinds of information of the dump truck 10. In the various kinds of information, for example, a vehicle speed of the dump truck 10, namely, a traveling speed of the dump truck 10, a temperature of cooling water of the engine 31 illustrated in FIG. 2, various kinds of alarms, and the like are included. The various kinds of information displayed on the monitor 60M includes, for example, necessary information for an operator who operates the dump truck in the case where the dump truck 10 travels in the first operation mode.

The TM controller 41, brake controller 42, engine controller 43, ABS controller 44, monitor 60M, and information collection device 60I store computer programs to implement the respective functions in the respective storage unit. In the TM controller 41, brake controller 42, engine controller 43, ABS controller 44, monitor 60M, and information collection device 60I, the respective processing units read, from the respective storage units, the computer programs necessary for control, and execute commands described in the computer programs, thereby controlling the equipment mounted on the dump truck 10.

A shift selector 46 is connected to the TM controller 41. The shift selector 46 designates a variable speed level of the gear box 33 illustrated in FIG. 2 and designates a variable speed mode in the case where the gear box 33 automatically changes the speed. Furthermore, in the case of the second operation mode, the TM gear box 41 controls the gear box 33 in accordance with a control command from the second control system 50. A brake sensor 47A and a hoist sensor 47B are connected to the brake controller 42. The brake sensor 47A detects an operation amount of at least one of a retarder lever and the brake pedal provided in the operating room 11DR of the dump truck 10. The brake controller 42 controls a braking state of the brake 13B of the dump truck 10 based on a detection value of the brake sensor 47A. The brake controller 42 makes the brake 13B of the dump truck 10 actuate when operation made to a hoist lever is detected by the hoist sensor 47B. Additionally, in the case of the second operation mode, the brake controller 42 controls the brake 13B in accordance with a control command from the second control system 50.

An accelerator position sensor 48 is connected to the engine controller 43. The accelerator position sensor 48 detects an operation amount of the accelerator pedal provided in the operating room 11DR of the dump truck 10. The engine controller 43 controls the engine 31 of the dump truck 10 based on an accelerator position command ACO that is a detection value of the accelerator position sensor 48. Additionally, in the case of the second operation mode, the engine controller 43 controls the engine 31 in accordance with a control command from the second control system 50. The rotation sensors 15 (front wheel side rotation sensor 15F and rear wheel side rotation sensor 15R) are connected to the ABS controller 44. The ABS controller 44 adjusts the brake force of the brake 13B based on detection values of the rotation sensors 15.

As the front wheel side rotation sensor 15F, there are: a left front wheel rotation sensor 15FL adapted to detect an engine speed of the front wheel on the left side; and a right front wheel rotation sensor 15FR adapted to detect an engine speed of the front wheel on the right side. As the rear wheel side rotation sensor 15R, there are: a left rear wheel rotation sensor 15RL adapted to detect an engine speed of the left-side rear wheel; and a right rear wheel rotation sensor 15RR adapted to detect an engine speed of the right-side rear wheel.

As illustrated in FIG. 3, the TM controller 41, brake controller 42, engine controller 43, ABS controller 44, monitor 60M, and information collection device 60I are electrically connected by a communication line 45. With this configuration, these components can mutually exchange information via the communication line 45. For example, the TM controller 41, brake controller 42, engine controller 43, and ABS controller 44 can obtain, via the communication line 45, information of other control units and detection values of sensors connected to other control units, and use the same for own control.

(Second Control System 50)

The second control system 50 includes, for example, an operation controller 51, an interface controller 52, a safety controller 53, a recording device 54, and a peripheral monitoring device 55. The operation controller 51, interface controller 52, safety controller 53, recording device 54, and peripheral monitoring device 55 are computers each including: a processing unit having a central processing unit (CPU) and the like; and a storage unit such as a read only memory (ROM), for example.

The operation controller 51 controls the dump truck 10 via the first control system 40 based on information obtained via the communication controller 19 and used to operate the dump truck 10 from the operation management device 2 in the second operation mode. In the operation controller 51, various kinds of sensors such as a gyro sensor 61, a vehicle speed sensor 62, a steering angle sensor 63, the left front wheel rotation sensor 15FL, the right front wheel rotation sensor 15FR, the left rear wheel rotation sensor 15RL, and the right rear wheel rotation sensor 15RR are connected. An acceleration speed sensor 64 is connected to the brake controller 42. The operation controller 51 obtains the information detected by the above-described various kinds of sensors, and makes the dump truck 10 automatically travel in the second operation mode. In the present embodiment, the operation controller 51 includes a timer 51M inside thereof. The timer 51M is used at the time determining whether to execute second drive force control described later.

The interface controller 52 is connected to a communication line 45 of the first control system 40 by a communication line 21. The interface controller 52 monitors a state of the first control system 40 via the communication line 21.

Furthermore, the interface controller 52 transmits information from the second control system 50 to the first control system 40 after converting the same in a format understandable by the first control system 40, for example, converting a communication protocol, and also transmits information from the first control system 40 to the second control system 50 after converting the same in a format understandable by the second control system 50. The safety controller 53 controls a headlight, a blinker, a horn, an engine starter, and a parking brake, and the like of the dump truck 10. The recording device 54 records, for example, a travel route of the dump truck 10 by recoding a position of the dump truck 10 obtained from the GPS receiver 18B in a manner correlated to time elapsed.

The peripheral monitoring device 55 includes, for example, a radar sensor and a laser sensor, and detects an object existing ahead in a moving direction or in the periphery of the dump truck 10. In the case where the dump truck 10 travels in the second operation mode, the operation controller 51 and the safety controller 53 actuates the brake 13B of the dump truck 10 to stop the dump truck 10 based on object information detected by the peripheral monitoring device 55. Meanwhile, the operation controller 51 and the safety controller 53 may reduce output of the engine 31 and may also steer the front wheels 13F. For example, in the case an object is detected ahead in the moving direction of the dump truck 10, the operation controller 51 avoids collision with the object by actuating the brake 13B of the dump truck 10 to reduce a speed or stop the dump truck 10 and by steering the front wheels 13F. Furthermore, in the case where darkness in the periphery is detected by the peripheral monitoring device 55, the safety controller 53 may turn on the headlight of the dump truck 10.

The operation controller 51, interface controller 52, and safety controller 53 store, in the respective storage units, computer programs to implement the respective functions. The operation controller 51, interface controller 52, and safety controller 53 control the dump truck 10 by respective processing units reading the computer programs necessary for control from the respective storage units and executing commands described in the computer programs.

The operation controller 51, interface controller 52, and safety controller 53 are electrically connected by a communication line 56. With this configuration, these components can mutually exchange information. For example, the operation controller 51, interface controller 52, and safety controller 53 can obtain information of other control units or detection values of sensors connected to other control units via the communication line 56, and use the same for processing.

The communication line 56 is connected to the communication controller 19. The operation controller 51 obtains, from the communication controller 19 via the communication line 56, information transmitted by the operation management device 2 illustrated in FIG. 1 and used to automatically operate the dump truck 10 in the second operation mode. Additionally, the second control system 50 transmits, to the operation management device 2, information related to the state of the dump truck 10 that is performing automatic operation in the second operation mode, via the communication line 56 and the communication controller 19. The TM controller 41 of the first control system 40, engine controller 43, brake controller 42, and ABS controller 44 can obtain information detected by the various kinds of sensors such as the gyro sensor 61 and the vehicle speed sensor 62 connected to the operation controller 51 of the second control system 50 via the communication line 56, interface controller 52, communication line 21, and the communication line 45.

The operation controller 51, safety controller 53, recording device 54, and peripheral monitoring device 55 are electrically connected via a communication line 57. With this configuration, these components can mutually exchange information. The operation controller 51, interface controller 52, and recording device 54 obtain, for example, information related to an object existing in the periphery of the dump truck 10 detected by the peripheral monitoring device 55 via the communication line 57, and can use the information for control in the second operation mode.

The operation controller 51 generates an accelerator position command ACO, a shift control command SLC, and a brake command BRC, and transmits the same to the first control system 40 via the communication line 56, interface controller 52, and communication line 21. The engine controller 43 of the first control system 40 obtains the accelerator position command ACO and controls output of the engine 31 illustrated in FIG. 2. The TM controller 41 of the first control system 40 obtains the shift control command SLC and the accelerator position command ACO, and changes a variable speed level of the gear box 33 illustrated in FIG. 2. In the first operation mode, the TM controller 41 obtains, from the engine controller 43, the accelerator position command ACO that is a detection value detected by the accelerator position sensor 48. In the second operation mode, the TM controller 41 obtains, from the communication line 45, the accelerator position command ACO generated by the operation controller 51 of the second control system 50. The brake controller 42 of the first control system 40 obtains the brake command BRC and controls the brake 13B illustrated in FIG. 2.

In the case where the dump truck 10 is made to perform automatic operation in the second operation mode, the operation controller 51 generates at least one of the accelerator control command ACO, shift control command SLC, and brake command BRC based on the information obtained from the operation management device 2 and used to operate the dump truck 10 in the second operation mode. Then, the operation controller 51 controls the dump truck 10 via the first control system 40 in accordance with at least one of the accelerator control command ACO, shift control command SLC, and brake command BRC.

<Drive Force Control>

In the case where the rear wheel 13R that is the drive wheel of the dump truck 10 illustrated in FIG. 2 idles, namely, slips in the second operation mode, the operation controller 51 executes control to suppress slipping by reducing force with which the drive device 30 of the dump truck 10 drives the rear wheel 13R. Such control is referred to as drive force control or traction control. The force with which the drive device 30 drives the rear wheel 13R will be referred to as driven force of the rear wheel 13R.

The drive force control includes: suppressing slipping by actuating the rear wheel brake 13BR and reducing the drive force for the rear wheel 13R; and suppressing slipping by reducing the drive force for the rear wheel 13R by reducing output of the engine 31 illustrated in FIG. 2. In the following, the drive force control using the rear wheel brake 13BR will be referred to as first drive force control, and the drive force control to reduce output of the engine 31 will be referred to as second drive force control.

<Control Method for Work Vehicle>

Figure 4:
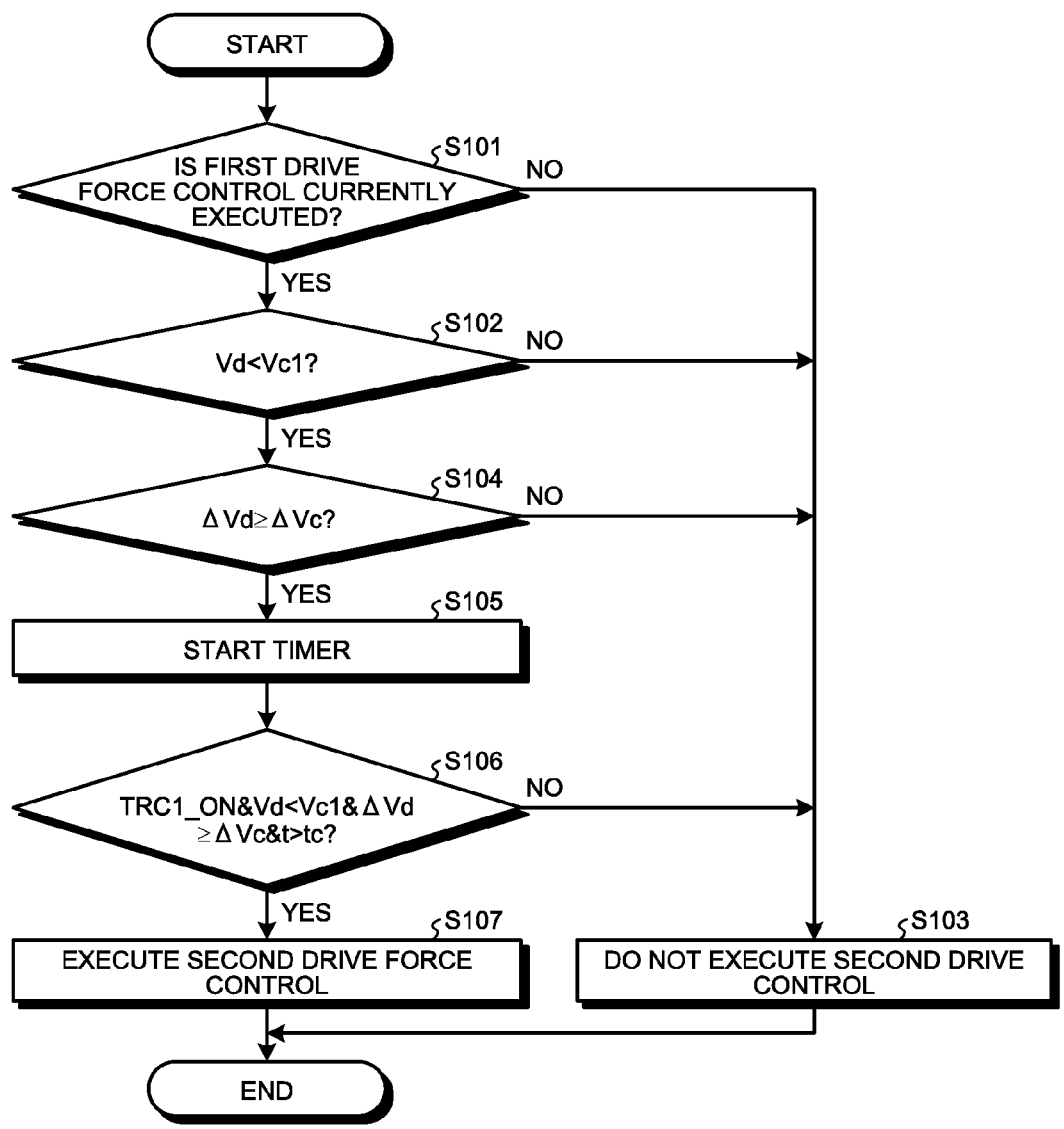
FIG. 4 is a flowchart illustrating a procedure at the time of executing a control method for the work vehicle according to the present embodiment.

FIG. 4 is a flowchart illustrating a procedure at the time of executing a control method for the work vehicle according to the present embodiment. The control method for the work vehicle according to the present embodiment is executed by the control system 20 illustrated in FIG. 3. In the following, described is a case where the control system 20 makes the dump truck 10 perform automatic operation in the second operation mode, but it may also be a case where the dump truck 10 travels in the first operation mode in accordance with operation by an operator.

In Step S101, the operation controller 51 of the second control system 50 determines whether the first drive force control is currently executed. The first drive force control is achieving by the brake controller 42 of the first control system 40 illustrated in FIG. 3 actuating the rear wheel brake 13BR that is the drive wheel illustrated in FIG. 2 and reducing the drive force for the rear wheels 13R.

While the first drive force control is executed, the brake controller 42 outputs, to the communication line 45, information indicating that the first drive force control is currently executed. The operation controller 51 of the second control system 50 illustrated in FIG. 3 can obtain the information indicating that the first drive force control is currently executed via the communication line 45, communication line 21, interface controller 52, and communication line 56. The operation controller 51 determines whether the first drive force control is currently executed based on this information.

(First Drive Force Control)

In the present embodiment, the first drive force control is control to brake a slipping wheel out of the left-side rear wheel 13R and the right-side rear wheel 13R which are the plurality of drive wheels such that a slip ratio of the slipping wheel becomes a target value of the slip ratio of the drive wheel, namely, the rear wheel 13R. In the following, the target value of the slip ratio will be suitably referred to as a target slip ratio.

Figures 1, 5:
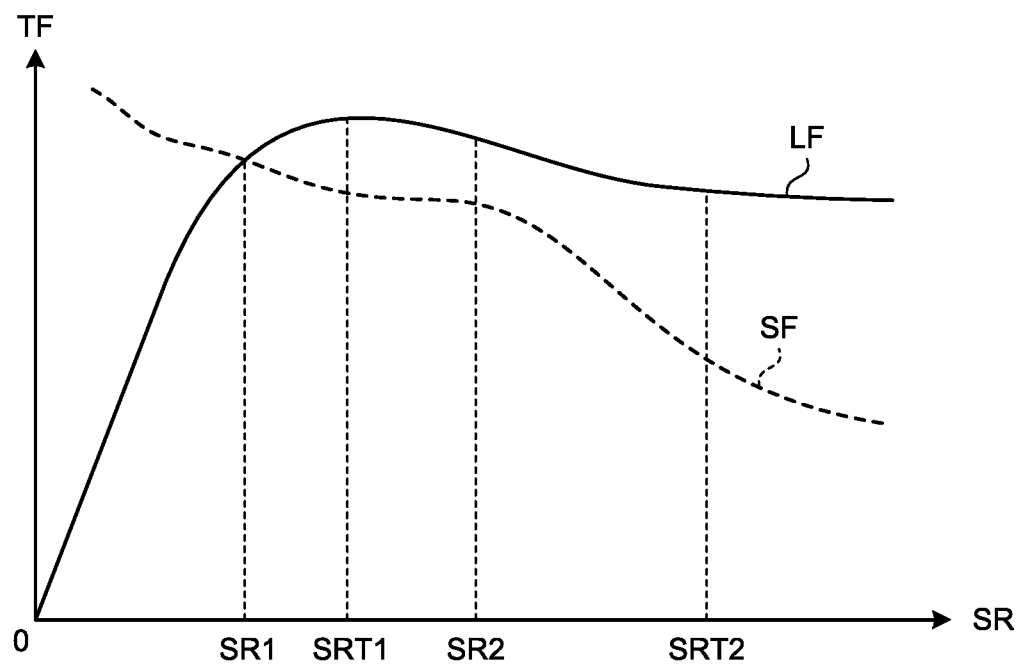
Figures 2, 5:
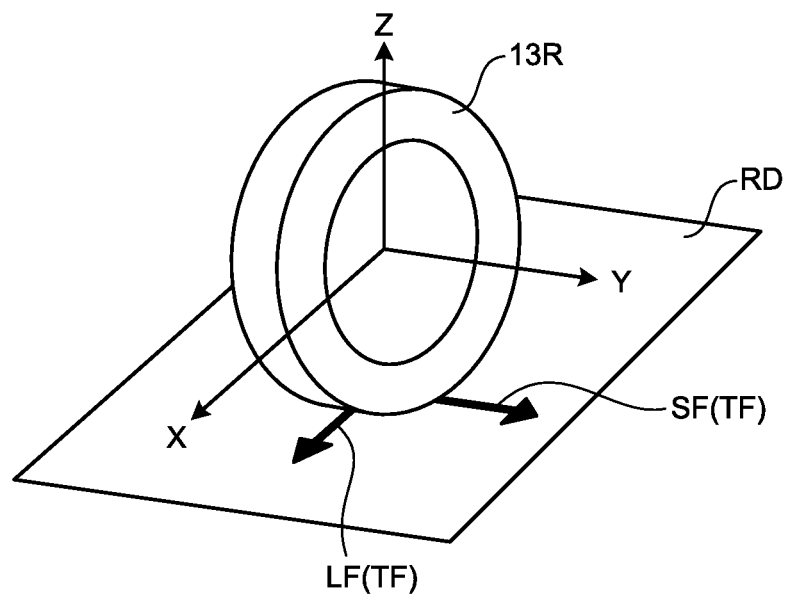

FIG. 5-1 is a diagram illustrating a relation between a slip ratio SR and friction force TF. FIG. 5-2 is a diagram illustrating the rear wheel 13R that is the drive wheel and a road surface RD where the rear wheel 13R contacts. In the following, a target slip ratio used in the first drive force control will be referred to as a first target slip ratio SRT1, and a target slip ratio used in the second drive force control described later will be referred to as a second target slip ratio SRT2. The first target slip ratio SRT1 is, for example, about 0.35 while the second target slip ratio SRT2 is, for example, about 0.6. Thus, the second target slip ratio SRT2 is a value larger than the first target slip ratio SRT1. The friction force TF in FIG. 5-1 is force generated between the rear wheel 13R and the road surface where the rear wheel 13R contacts as illustrated in FIG. 5-2. Provided that a rotation speed of the rear wheel 13R is Vw and an actual vehicle speed of the dump truck 10 is Vd, the slip ratio SR is represented by a Formula (1).

$$SR=(Vw-Vd)/Vw \quad (1)$$

The actual vehicle speed Vd of the dump truck is a speed when the dump truck 10 is actually traveling. As the actual vehicle speed Vd, for example, a detection value of the vehicle speed sensor 62 illustrated in FIG. 3 is used. Besides that, as the actual vehicle speed Vd, an integration value of a detection value of the acceleration speed sensor 64 illustrated in FIG. 3, or a value acquired from a position of the dump truck 10 obtained from the GPS receiver 18B illustrated in FIG. 3 may also be used. The rotation speed Vw of the rear wheel 13R can be acquired from a detection value of the rear wheel side rotation sensor 15R illustrated in FIGS. 2 and 3. Since there are the left side rear wheel 13R and the right side rear wheel 13R as the rear wheels 13R, the rotation speed Vw of the rear wheel 13R is independently acquired on each of the left side and the right side. A rotation speed Vwl of the left-side rear wheel 13R is acquired from a detection value of the left rear wheel rotation sensor 15RL illustrated in FIG. 3, and a rotation speed Vwr of the right-side rear wheel 13R is acquired from a detection value of the right rear wheel rotation sensor 15RR illustrated in FIG. 3.

As illustrated in FIG. 5-2, a rotation center axis of the rear wheel 13R is defined as Y-axis, an axis orthogonal to the Y-axis and parallel to a tangential direction of the rear wheel 13R at a portion where the rear wheel 13R contacts the road surface RD is defined as X-axis, and an axis orthogonal to both of the X-axis and the Y-axis is defined as Z-axis. An LF direction is a direction parallel to the X-axis of the rear wheel 13R and parallel to the road surface RD at the portion where rear wheel 13R contacts, and an SF direction is a direction parallel to the Y-axis of the rear wheel 13R and also parallel to the road surface RD where the rear wheel 13R contacts.

The friction force TF in the LF direction, which is generated between the rear wheel 13R and the road surface RD, is drive force for the rear wheel 13R. The drive force of the rear wheel 13R is also referred to as traction force. The friction force TF in the SF direction, which is generated between the rear wheel 13R and the road surface RD, is side force, namely, lateral force for the rear wheel 13R. In the following, the drive force will be suitably referred to as drive force LF, and the lateral force will be suitably referred to as lateral force SF. As illustrated in FIG. 5-1, the drive force LF is increased along with increase of the slip ratio SR, and reaches a maximal value. After the drive force LF reaches the maximal value, the drive force LF is decreased along with increase of the slip ratio SR. The lateral force SF is decreased along with increase of the slip ratio SR.

The first drive force control brakes the rear wheel 13R such that the rear wheel 13R generates the drive force LF and lateral force SF as much as possible. Therefore, in the first drive force control of the present embodiment, the brake controller 42 of the first control system 40 illustrated in FIG. 3 actuates and brakes the brake 13B of a slipping rear wheel 13R such that the slip ratio of the slipping rear wheel 13R becomes the set first target slip ratio SRT1. The first target slip ratio SRT1 may be, for example, a slip ratio SR in which the drive force LF for the rear wheel 13R becomes maximal, or may be a value existing in a range from the slip ratio SR1 to the slip ratio SR2 including the slip ratio SR in which the drive force LF for the rear wheel 13R becomes maximal. The range from the slip ratio SR1 to the slip ratio SR2 is the range where the slip ratio SR is allowed when the dump truck 10 is traveling.

The first target slip ratio SRT1 may be changed in accordance with a state of the road surface. For example, when the road surface where the dump truck 10 travels is dry, the first target slip ratio SRT1 may be set to a value different from a value while it rains. Additionally, information related to the state of the road surface may be preliminarily included in target route information transmitted to the dump truck 10 from the operation management device 2 illustrated in FIG. 1, and the operation controller 51 of the second control system 50 illustrated in FIG. 3 may change, based on the obtained information related to the road surface obtained, the first target slip ratio SRT1 which the brake controller 42 refers to.

In the present embodiment, the brake controller 42 illustrated in FIG. 3 obtains the rotation speed Vw of the rear wheel 13R and the actual vehicle speed Vd of the dump truck 10, and acquires the actual slip ratio SR, and then performs control such that this slip ratio SR becomes the first target slip ratio SRT1, thereby achieving the first drive force control. Furthermore, the first drive force control may also be achieved as follows. For example, the operation controller 51 illustrated in FIG. 3 obtains the rotation speed Vw of the rear wheel 13R and the actual vehicle speed Vd of the dump truck 10, and acquires the slip ratio SR, and then generates a brake command BRC such that the slip ratio SR becomes the first target slip ratio SRT1. The brake controller 42 controls the brake 13B of the rear wheel 13R illustrated in FIG. 2 based on the brake command BRC generated by the operation controller 51.

The first drive force control of the present embodiment is performed such that the slip ratio SR of the slipping rear wheel 13R becomes the first target slip ratio SRT1. Therefore, since the operation controller 51 can control the slip ratio SR of the slipping rear wheel 13R, the rear wheel brake 13BR can be controlled so as to obtain the maximal drive force LF and lateral force SF from the rear wheel 13R. Furthermore, the first drive force control of the present embodiment detects slipping in each of the plurality of rear wheels 13R, and can suppress slipping in each of the detected rear wheels 13R.

(Processing after Step S101)

In the case where the operation controller 51 determines that the first drive force control is currently executed (Step S101, Yes), the control system 20 proceeds with the processing to Step S102. In the case where the operation controller 51 determines that the first drive force control is not currently executed (Step S101, No), the control system 20 proceeds with the processing to Step S103. In Step S103, the control system 20 does not execute the second drive force control during execution of the first drive force control.

In Step S102, in the case where the actual vehicle speed Vd of the dump truck 10 is less than a first vehicle speed threshold Vc1 (Step S102, Yes), the control system 20 proceeds with the processing to Step S104. In the case where the actual vehicle speed Vd is the first vehicle speed threshold Vc1 or more (Step S102, No), the control system 20 proceeds with the processing to Step S103. In Step S103, the control system 20 does not execute the second drive force control during execution of the first drive force control.

In the present embodiment, the first vehicle speed threshold Vc1 is a value to determine whether it is a case where the dump truck 10 may be stuck at an extremely slippy road surface such as a muddy road surface or a frozen road surface. Therefore, preferably, the first vehicle speed threshold Vc1 is a speed immediately before the dump truck 10 gets stuck. In the present embodiment, the first vehicle speed threshold Vc1 is, for example, 1 km/h, but not limited thereto.

In Step S104, in the case where a speed difference ΔVd between the rear wheel 13R and the front wheel 13F that is the driven wheel is a speed difference threshold ΔVc or more (Step S104, Yes), the control system 20 proceeds with the processing to Step S105. In the case where the speed difference ΔVd is less than the speed difference threshold ΔVc (Step S104, No), the control system 20 proceeds with the processing to Step S103. In Step S103, the control system 20 does not execute the second drive force control during execution of the first drive force control.

In the present embodiment, the speed difference ΔVd is a difference between the rotation speed Vw of the rear wheel 13R and the rotation speed Vf of the front wheel 13F The speed difference threshold ΔVc is a threshold of a rotation speed difference and also a value to determine whether the dump truck 10 is in a state immediately before getting stuck at the extremely slippy road surface. Therefore, preferably, the speed difference threshold ΔVc is the value based on which it can be determined that the rotation speed Vw of the rear wheel 13R has reached a high rotation speed of a certain level or more, compared to the rotation speed of the front wheel 13F. In the present embodiment, the speed difference threshold ΔVc is, for example, 5 km/h, but not limited thereto.

Preferably, the speed difference ΔVd is a maximal value between the plurality of front wheels 13F and the plurality of rear wheels 13R. Provided that a rotation speed of the left-side front wheel 13F is Vfwl, a rotation speed of the right-side front wheel 13F is Vfwr, a rotation speed of the left-side rear wheel 13R is Vwl, and the rotation speed of the right-side rear wheel 13R is Vwr, the speed difference ΔVd can be acquired by a Formula (2). "max" in the Formula (2) indicates selecting a maximal value inside a parenthesis, and "min" indicates selecting a minimal value inside a parenthesis.

$$\Delta Vd = \max(Vwl, Vwr) - \min(Vfwl, Vfwr) \qquad (2)$$

In Step S105, the operation controller 51 illustrated in FIG. 3 starts the timer 51M and starts counting time t. Next, in Step S106, in the case where TRC1_ON, namely, the time t exceeds a time threshold tc during actuation of the first drive force control while all of Vd<Vc1 and ΔVd≥ΔVc are satisfied, the operation controller 51 proceeds with the processing to Step S107. In Step S107, the control system 20 executes the second drive force control during execution of the first drive force control. In the case where the time t is the time threshold tc or less, when at least one of TRC_ON, Vd<Vc1, and ΔVd≥ΔVc is not satisfied, the control system 20 does not execute the second drive force control during execution of the first drive force control in Step S103. Next, the second drive force control will be described.

(Second Drive Force Control)

Figure 6:
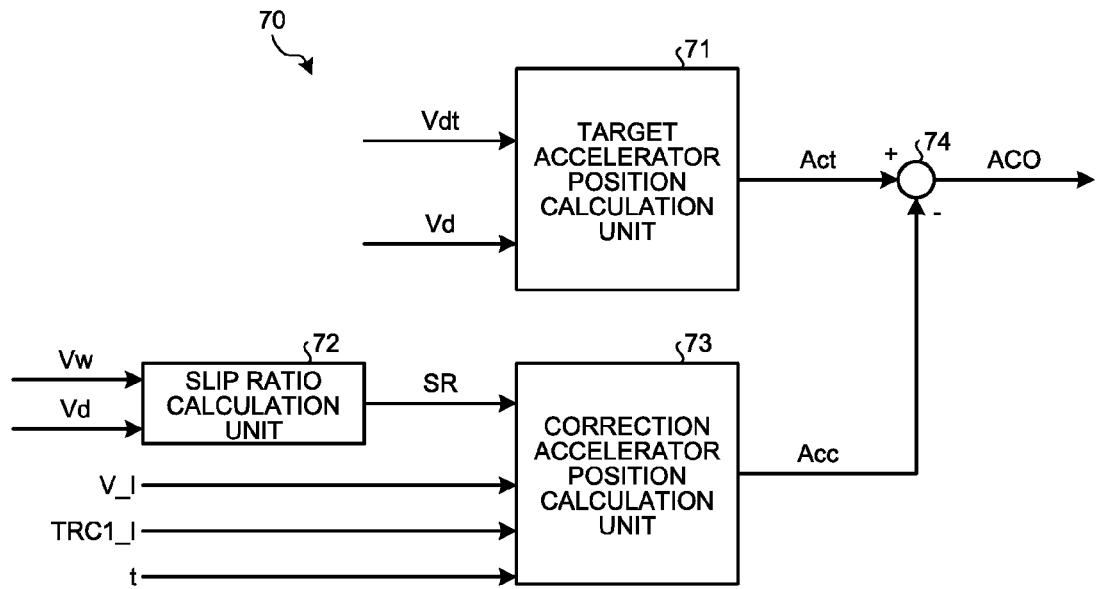
FIG. 6 is a block diagram illustrating an output suppression arithmetic unit.

FIG. 6 is a block diagram illustrating an output suppression arithmetic unit 70. In the present embodiment, the operation controller 51 illustrated in FIG. 3 achieves the second drive force control by changing the accelerator position command ACO by the output suppression arithmetic unit 70 illustrated in FIG. 6. The output suppression arithmetic unit 70 is provided at the operation controller 51 and executes the second drive force control. The output suppression arithmetic unit 70 includes a target accelerator position calculation unit 71, a slip ratio calculation unit 72, a correction accelerator position calculation unit 73, and a subtraction unit 74.

The target accelerator position calculation unit 71 of the output suppression arithmetic unit 70 calculates a target vehicle speed Vdt, namely, a target vehicle speed of the dump truck 10 that travels in the second operation mode, and a target accelerator position Act based on the actual vehicle speed Vd of the dump truck 10. The target vehicle speed Vdt is transmitted to the dump truck 10 from the operation management device 2 illustrated in FIG. 1, and obtained by the operation controller 51 via the communication device 19S illustrated in FIGS. 2 and 3, for example. The target accelerator position calculation unit 71 calculates the target accelerator position Act such that the actual vehicle speed Vd of the dump truck 10 becomes the target vehicle speed Vdt. For example, the target accelerator position calculation unit 71 calculates the target accelerator position Act such that a deviation between the actual vehicle speed Vd and the target vehicle speed Vdt of the dump truck 10 becomes zero.

The target accelerator position calculation unit 71 outputs the calculated target accelerator position Act to the subtraction unit 74.

The slip ratio calculation unit 72 calculates the slip ratio SR of the rear wheel 13R based on the rotation speed Vw of the rear wheel 13R and the actual vehicle speed Vd of the dump truck 10, and outputs the same to the correction accelerator position calculation unit 73. The rotation speed Vw is a speed in a tangential direction of the rear wheel 13R acquired from the rear wheel side rotation sensor 15R of the rear wheel 13R illustrated in FIG. 2. The actual vehicle speed Vd is acquired from the front wheel side rotation sensor 15F illustrated in FIG. 2. The vehicle speed Vd may be a vehicle speed acquired from a position of the dump truck 10 obtained from the GPS receiver 18B illustrated in FIG. 3. The slip ratio SR can be acquired by the above-described Formula (1). Preferably, the slip ratio SR that is maximal among the slip ratios SR of the existing plurality of rear wheels 13R is output to the correction accelerator position calculation unit 73. In this case, provided that the slip ratio of the left-side rear wheel 13R is SRl and the slip ratio of the right-side rear wheel 13R is SRr, the slip ratio SR output from the slip ratio calculation unit 72 is represented by a Formula (3).

$$SR = \max(SRl, SRr) \quad (3)$$

The correction accelerator position calculation unit 73 calculates a correction accelerator position Acc based on the slip ratio SR acquired by the slip ratio calculation unit 72, namely, the slip ratio SR of the slipping drive wheel. The correction accelerator position calculation unit 73 determines whether to output the calculated correction accelerator position Acc to the subtraction unit 74 based on speed information V_I of the dump truck 10, operational information TRC1_I of the first drive force control, and the time t counted by the timer 51M of the operation controller 51 illustrated in FIG. 3. The speed information V_I of the dump truck 10 includes the actual vehicle speed Vd, rotation speed Vw of the rear wheel 13R and the rotation speed Vf of the front wheel 13F illustrated in FIG. 3.

As described in Step S106 in the control method for the work vehicle according to the present embodiment, the correction accelerator position calculation unit 73 outputs the calculated correction accelerator position Acc to the subtraction unit 74 in the case where the time t exceeds the threshold tc while all of TRC1_ON, Vd<Vc1, and ΔVd≥ΔVc are satisfied. In the case where the time t is the time threshold tc or less and at least one of TRC_ON, Vd<Vc1, and ΔVd≥ΔVc is not satisfied, the correction accelerator position calculation unit 73 does not output the correction accelerator position Acc to the subtraction unit 74. In this case, the correction accelerator position calculation unit 73 may not calculate the correction accelerator position Acc, thereby preventing the correction accelerator position Acc from being received in the subtraction unit 74.

The subtraction unit 74 subtracts the correction accelerator position Acc received from the correction accelerator position calculation unit 73 from the target accelerator position Act received from the target accelerator position calculation unit 71, and outputs a result thereof as the accelerator position command ACO. In the case where the correction accelerator position Acc is zero, the target accelerator position Act becomes the accelerator position command ACO. The engine controller 43 illustrated in FIG. 3 obtains the accelerator position command ACO via the communication line 56 and the interface controller 52 of the second control system 50, the communication line 21, and the communication line 45 of the first control system 40, and controls output of the engine 31 illustrated in FIG. 2. Next, an exemplary method to calculate the correction accelerator position Acc will be described.

(First Exemplary Calculation of Correction Accelerator Position Acc)

Figure 7:
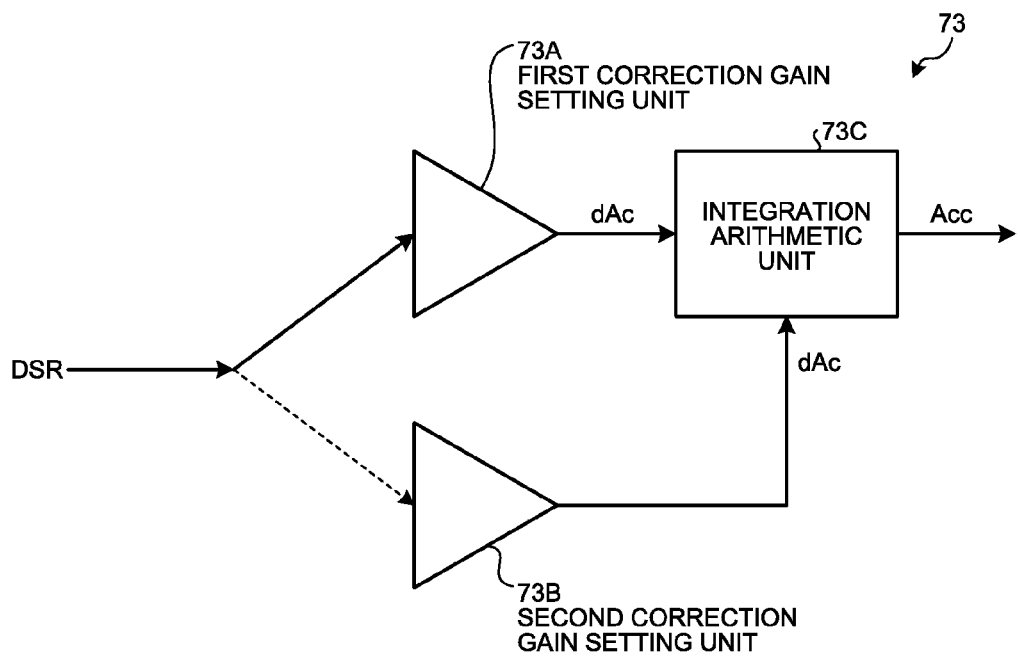
FIG. 7 is a block diagram illustrating a correction accelerator position calculation unit.

FIG. 7 is a block diagram illustrating the correction accelerator position calculation unit 73. In the first exemplary calculation, the correction accelerator position calculation unit 73 includes a first correction gain setting unit 73A, a second correction gain setting unit 73B, and an integration arithmetic unit 73C. The correction accelerator position calculation unit 73 calculates a correction accelerator position Acc based on a slip ratio deviation DSR. Provided that the second target slip ratio is SRT2, the slip ratio deviation DSR can be acquired by a Formula (4). The slip ratio SR in the Formula (4) is an actual slip ratio of the dump truck 10 and can be acquired by the Formula (1). In the present embodiment, the slip ratio calculation unit 72 illustrated in FIG. 6 calculates the slip ratio SR. The second target slip ratio SRT2 is set inside the operation controller 51, for example.

$$DSR = SR - SRT2 \quad (4)$$

The correction accelerator position calculation unit 73 calculates the slip ratio deviation DSR from the obtained slip ratio SR and second target slip ratio SRT2. The slip ratio deviation DSR is received in the first correction gain setting unit 73A or the second correction gain setting unit 73B, but where to be received is different depending on a value of the slip ratio SR or whether the slip ratio deviation DSR is positive or negative. In the first correction gain setting unit 73A, a correction gain P_GN used in the case where the slip ratio SR is the second target slip ratio SRT2 or more is set. In the second correction gain setting unit 73B, a correction gain N_GN used in the case where the slip ratio SR is less than the second target slip ratio SRT2 is set.

In the case where the slip ratio SR is the second target slip ratio SRT2 or more, the slip ratio deviation DSR is received in the first correction gain setting unit 73A. The first correction gain setting unit 73A outputs, to the integration arithmetic unit 73C, an accelerator position correction amount dAc obtained by multiplying the slip ratio deviation DSR by the correction gain P_GN. The accelerator position correction amount dAc is DSR×P_GN.

In the case where the slip ratio SR is less than the second target slip ratio SRT2, the slip ratio deviation DSR is received in the second correction gain setting unit 73B. The second correction gain setting unit 73B outputs, to the integration arithmetic unit 73C, an accelerator position correction amount dAc obtained by multiplying the slip ratio deviation DSR by the correction gain N_GN. The accelerator position correction amount dAc is DSR×N_GN. Provided that an accelerator position when the engine 31 illustrated in FIG. 2 is in an idling state is 0% and an accelerator position when output of the engine 31 becomes maximal is 100%, preferably, the accelerator position correction amount dAc is 0% or more and less than 100%. In the present embodiment, the accelerator position correction amount dAc is 0% or more and 75% or less. By thus setting, the accelerator position can be set so as not to become 0%. Therefore, drive force of the rear wheel 13R can be prevented from becoming zero in the second drive force control.

The integration arithmetic unit 73C integrates the accelerator position correction amount dAc, and outputs an integration result as the correction accelerator position Acc to the subtraction unit 74 illustrated in FIG. 6. Provided that a correction accelerator position after previous integration is Accb, the correction accelerator position Acc after integration becomes as shown in a Formula (5). In the case of first time, since the previous correction accelerator position Accb is zero, the correction accelerator position Acc after integration becomes dAc based on the Formula (5).

$$Acc = Accb + dAc \quad (5)$$

(Finish of Second Drive Force Control)

The operation controller 51 illustrated in FIG. 3 finishes the second drive force control currently executed in the case where the first drive force control is finished or the actual vehicle speed Vd of the dump truck 10 becomes a second vehicle speed threshold Vc2 or more while the second drive force control is currently executed. The second vehicle speed threshold Vc2 is larger than the first vehicle speed threshold Vc1. Next, processing when the operation controller 51 finishes the second drive force control will be described.

Figure 8:
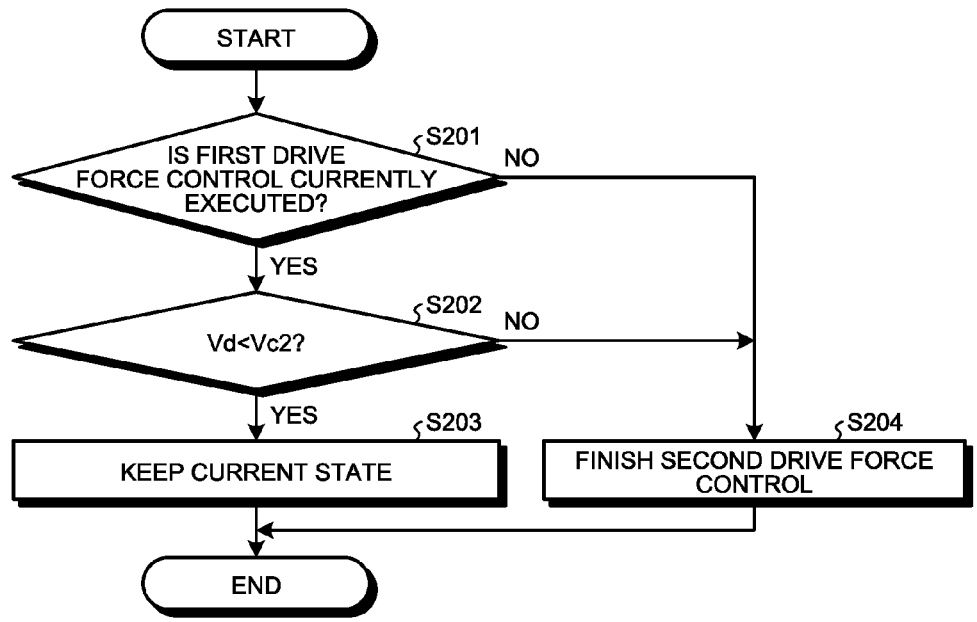
FIG. 8 is a flowchart illustrating processing at the time of finishing second drive force control.

FIG. 8 is a flowchart illustrating the processing at the time of finishing second drive force control. At the time of finishing the second drive force control, in the case where the first drive force control is currently executed in Step S201 (Step S201, Yes), the operation controller 51 proceeds with the processing to Step S202. In Step S202, in the case where the actual vehicle speed Vd is less than the second vehicle speed threshold Vc2 (Step S202, Yes), the operation controller 51 keeps a current state in Step S203, namely, keeps the state in which the second drive force control is executed during execution of the first drive force control.

In the case where the first drive force control is not executed (Step S201, No), namely, in the case where the first drive force control is finished or in the case where the actual vehicle speed Vd is the second vehicle speed threshold Vc2 or more (Step S202, No), the operation controller 51 finishes the second drive force control in Step S204. Since the second vehicle speed threshold Vc2 is a value to determine that the dump truck 10 has overcome a state of being stuck, the second vehicle speed threshold Vc2 is the value larger than the first vehicle speed threshold Vc1. In the present embodiment, the second vehicle speed threshold Vc2 is 3 km/h, but not limited thereto.

In the present embodiment, in the case where slipping of the rear wheel 13R cannot be sufficiently suppressed by the first drive force control, the operation controller 51 executes the second drive force control and reduces output of the engine 31 illustrated in FIG. 2. As a result, possibility that the dump truck 10 gets stuck at an extremely slippy road surface is reduced, and degradation of travel performance of the dump truck 10 can be suppressed.

In the second operation mode, the operation controller 51 illustrated in FIG. 3 calculates the accelerator position command ACO such that the actual vehicle speed Vd becomes the target vehicle speed Vdt. When the rear wheel 13R slips, the drive force LF of the rear wheel 13R is reduced and the actual vehicle speed Vd is reduced. Therefore, a difference between the actual vehicle speed Vd and the target vehicle speed Vdt becomes large. Since the operation controller 51 calculates the accelerator position command ACO larger such that the actual vehicle speed Vd becomes close to the target vehicle speed Vdt, the engine 31 illustrated in FIG. 2 generates larger output. As a result, the rear wheel 13R further slips and the dump truck 10 may get stuck.

In the second drive force control, the second target slip ratio SRT2 larger than the first target slip ratio SRT1 is used. Therefore, in the case where slipping of the rear wheel 13R cannot be resolved by the first drive force control, slipping of the rear wheel 13R is resolved to a certain level by correcting the accelerator position and reducing output from the engine 31, and then can be handled by the first drive force control. In other words, in the present embodiment, the operation controller 51 not only brakes the rear wheel 13R by using the rear wheel brake 13BR but also reduces output of the engine 31. Therefore, slipping of the rear wheel 13R is surely suppressed, and the dump truck 10 can continue travelling. As a result, even in the case of unmanned automatic travel by the second operation mode, possibility that the dump truck 10 gets stuck at an extremely slippy road surface can be reduced. Therefore, for example, delay of a production plan caused by the stuck dump truck 10 can be suppressed, and the number of times to assist the stuck dump truck 10 can be reduced.

A rotation system of the engine used in a work vehicle such as the dump truck 10 also has large mass because engine displacement thereof is larger than that of an engine used in a passenger car. Furthermore, response to change of the accelerator position is likely to be slow because output to mass of the vehicle is smaller compared to the passenger car. Therefore, when slipping of the drive wheel is suppressed only by changing the accelerator position for the engine used in the work vehicle, recovery from slipping may be slow. In the present embodiment, the operation controller 51 suppresses slipping of the rear wheel 13R by braking the rear wheel 13R at first by using the rear wheel brake 13BR, and in the case where the effect is insufficient, slipping of the rear wheel 13R is suppressed by reducing output of the engine 31. Thus, the operation controller 51 is not adapted to suppress slipping of the rear wheel 13R not only by reducing output of the engine 31 but also adapted to suppress slipping of the rear wheel 13R by reducing output of the engine 31 after suppressing slipping of the rear wheel 13R to a certain level by the rear wheel brake 13BR. Therefore, even in the case of the engine 31 used in the work vehicle and having large engine displacement, it is possible to reduce influence caused by slow response at the time of suppressing slipping of the rear wheel 13R by reducing output thereof.

<Second Exemplary Calculation of Correction Accelerator Position Acc>

Figure 9:
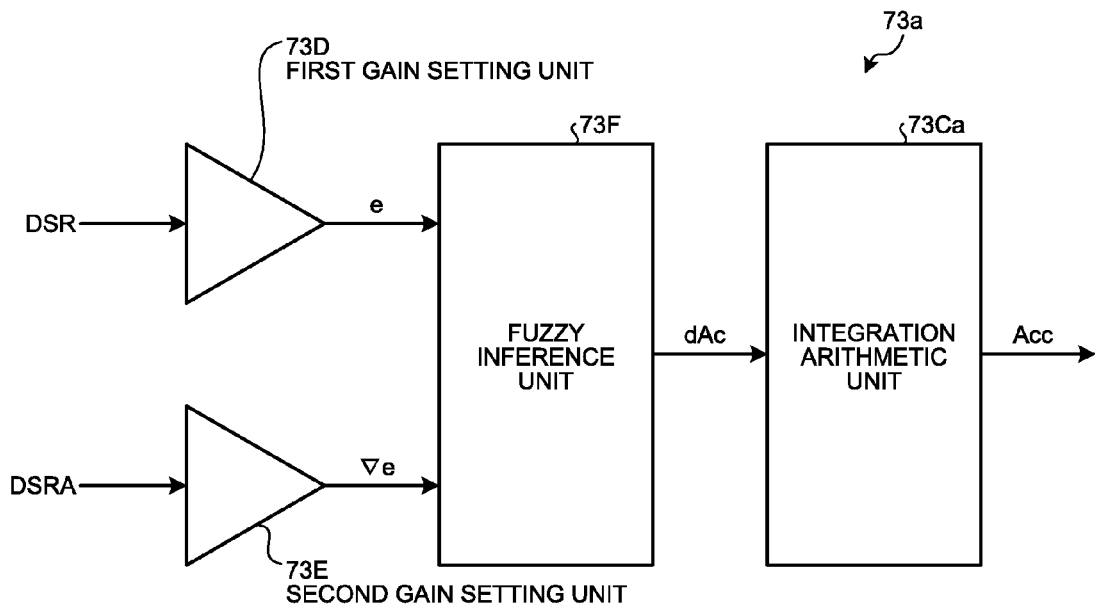
FIG. 9 is a block diagram illustrating a correction accelerator position calculation unit.
Figure 10:
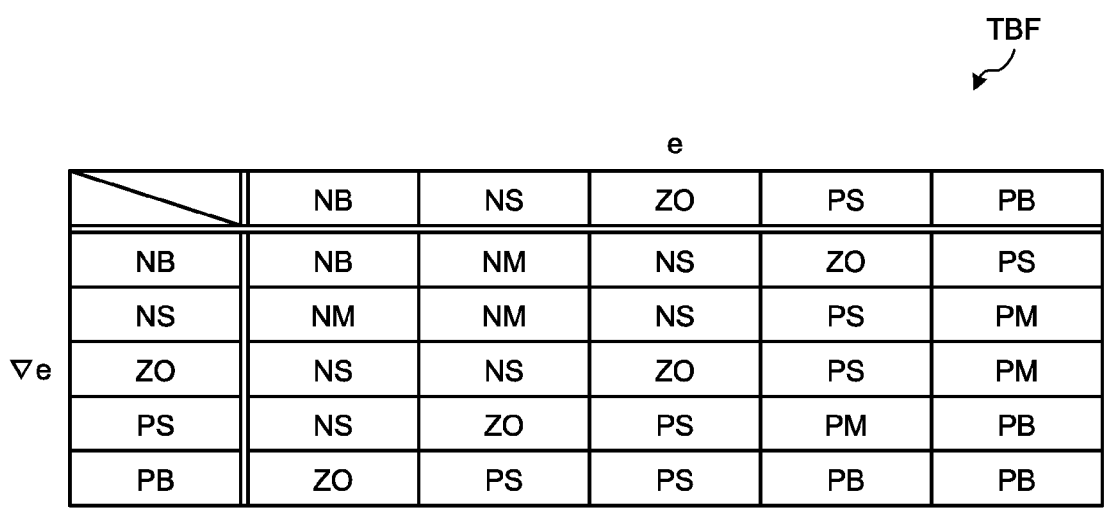
FIG. 10 is an exemplary fuzzy table.

FIG. 9 is a block diagram illustrating a correction accelerator position calculation unit 73a. FIG. 10 is an exemplary fuzzy table TBF. In the second exemplary calculation, the correction accelerator position calculation unit 73a is used instead of the correction accelerator position calculation unit 73 illustrated in FIG. 6. In this modified example, the correction accelerator position calculation unit 73a calculates a correction accelerator position Acc by using fuzzy control. The correction accelerator position calculation unit 73a includes a first gain setting unit 73D, a second gain setting unit 73E, a fuzzy inference unit 73F, and an integration arithmetic unit 73Ca.

The correction accelerator position calculation unit 73a calculates the correction accelerator position Acc based on the slip ratio deviation DSR and a slip ratio acceleration deviation DSRA. The slip ratio deviation DSR can be obtained by the above-described Formula (4). The slip ratio acceleration deviation DSRA can be obtained by a Formula (6). SRb in the Formula (6) indicates a previous value of the slip ratio, namely, an actual slip ratio of the dump truck 10 in a preceding cycle of control, and SRT2b indicates a previous value of the second target slip ratio value, namely, the second target slip ratio in a preceding cycle of control.

$$DSRA = (SR - SRT2b) - (SRT2 - SRb) \quad (6)$$

In the present embodiment, the slip ratio calculation unit 72 illustrated in FIG. 6 calculates the slip ratio SR and the previous value of the slip ratio SRb. The second target slip ratio SRT2 and the previous value of the second target slip ratio SRT2b are values larger than the first target slip ratio SRT1. For example, points common with the first exemplary calculation are: the second target slip ratio SRT2 is set inside the operation controller 51; and the value of the second target slip ratio SRT2 is the same.

The correction accelerator position calculation unit 73a calculates the slip ratio deviation DSR from the obtained slip ratio SR and the second target slip ratio SRT2, and calculates the slip ratio acceleration deviation DSRA from the obtained slip ratio SR, previous value of the slip ratio SRb, second target slip ratio SRT2, and previous value of the second target slip ratio SRT2b. The target slip ratio DSR is received in the first gain setting unit 73D, and the slip ratio acceleration deviation DSRA is received in the second gain setting unit 73E.

For the first gain setting unit 73D, Gain PF_GN for the slip ratio deviation DSR is set. The first gain setting unit 73D outputs, to the fuzzy inference unit 73F, a value obtained by multiplying the slip ratio deviation DSR by the gain PF_GN. For the second gain setting unit 73E, Gain DF_GN for the slip ratio acceleration deviation DSRA is set. The second gain setting unit 73E outputs, to the fuzzy inference unit 73F, a value obtained by multiplying the slip ratio acceleration deviation DSRA by the gain DF_GN. Provided that output of the first gain setting unit 73D is e and output of the second gain setting unit 73E is $\nabla e$, the former can be acquired by a Formula (7) and the latter can be acquired by a Formula (8).

$$e = PF\_GN \times DSR \quad (7)$$

$$\nabla e = DF\_GN \times DSRA \quad (8)$$

The fuzzy inference unit 73F uses, for example, the fuzzy table TBF illustrated in FIG. 10, and calculates the accelerator position correction amount dAc by inferring the received value e and value $\nabla e$ by using the Min-Max centroid method, for example. Fuzzy rules at this point may be, for example, following (A), (B), (C), and (D), but not limited to these examples.

(A) In the case where a received value is zero or more, the rear wheel 13R is slipping.

(B) In the case where a received value is less than zero, the rear wheel 13R is not slipping.

(C) In the case where an inference result is zero or more, a reduced amount of the accelerator position is to be increased.

(D) In the case where an inference result is less than zero, a reduced amount of the accelerator position is to be decreased.

The accelerator position correction amount dAc acquired by the fuzzy inference unit 73F is received in the integration arithmetic unit 73Ca. Since processing in the integration arithmetic unit 73Ca is the same as the processing in the integration arithmetic unit 73C of the above-described correction accelerator position calculation unit 73, a description therefor will be omitted. Thus, in the present embodiment, the accelerator position correction amount dAc can be calculated by fuzzy control.

(Modified Example of First Drive Force Control)

In the present embodiment, when the first drive force control is executed, the control system 20 illustrated in FIG. 3 brakes the slipping rear wheel brake 13BR such that the slip ratio SR of the slipping rear wheel 13R becomes the first target slip ratio SRT1. The first drive force control is not limited to this control, and following control may also be possible.

For example, the brake controller 42 illustrated in FIG. 3 recognizes slipping of the rear wheel 13R that is the drive wheel based on a deviation between the rotation speed Vwl of the left-side rear wheel 13R and the rotation speed Vwr of the right-side rear wheel 13R. Then, the brake controller 42 actuates the brake 13BR of the slipping rear wheel and performs control such that the rotation speed Vwl of the left-side rear wheel 13R and the rotation speed Vwr of the right-side rear wheel 13R become the same. In the control of the modified example also, the first drive force control can be achieved. In the control of the modified example, the first target slip ratio SRT1 is not needed.

While the present embodiment has been described above, note that the present embodiment is not limited to the described content. Further, the components described above may include components readily conceivable by those skilled in the art, components substantially identical, and components in a so-called equivalent range. Further, the components described above can be suitably combined. Furthermore, various kinds of omission, replacement, and modification may be made in the components in the scope without departing from the gist of the present embodiment. For example, in the present embodiment, the first control system 40 and the second control system 50 include the plurality of controllers, but may also be implemented by one controller.

In the present embodiment, provided is the example of the work vehicle that travels in an unmanned state based on the information obtained from the outside through communication. However, the work vehicle may also be the one that automatically travels based on information of travel data (e.g., travel road data, speed data, etc.) which an operator preliminarily stores in the system inside the work vehicle. In the present embodiment, provided is the example of the work vehicle in which manned travel and unmanned travel are switchable. However, only manned travel can be performed in the work vehicle. In this case, the second control system 50 is not included. Therefore, the output suppression arithmetic unit 70 may be provided at the engine controller 43 of the first control system 40, for example. As a target accelerator position Act to be received in the subtraction unit 74, a signal in accordance with an operation amount of the accelerator pedal operated by the operator, such as a detection value of the accelerator position sensor 48, is received in the output suppression arithmetic unit 70.

REFERENCE SIGNS LIST

1 UNMANNED DUMP OPERATION SYSTEM
2 OPERATION MANAGEMENT DEVICE
4 RADIO COMMUNICATION DEVICE
10 DUMP TRUCK
11 VEHICLE BODY
12 VESSEL
13B BRAKE
13BF FRONT WHEEL BRAKE
13BR REAR WHEEL BRAKE
13F FRONT WHEEL
13R REAR WHEEL
15 ROTATION SENSOR
15F FRONT WHEEL SIDE ROTATION SENSOR
15FL LEFT FRONT WHEEL ROTATION SENSOR
15FR RIGHT FRONT WHEEL ROTATION SENSOR

15R REAR WHEEL SIDE ROTATION SENSOR
15RL LEFT REAR WHEEL ROTATION SENSOR
15RR RIGHT REAR WHEEL ROTATION SENSOR
19 COMMUNICATION CONTROLLER
19S COMMUNICATION DEVICE
20 CONTROL SYSTEM
21 COMMUNICATION LINE
30 DRIVE DEVICE
31 ENGINE
32 TORQUE CONVERTER
40 FIRST CONTROL SYSTEM
41 TM CONTROLLER
42 BRAKE CONTROLLER
43 ENGINE CONTROLLER
44 ABS CONTROLLER
45 COMMUNICATION LINE
50 SECOND CONTROL SYSTEM
51 OPERATION CONTROLLER
51M TIMER
52 INTERFACE CONTROL DEVICE
53 SAFETY CONTROLLER
54 RECORDING DEVICE
55 PERIPHERAL MONITORING DEVICE
56, 57 COMMUNICATION LINE
60I INFORMATION COLLECTION DEVICE
60M MONITOR
62 VEHICLE SPEED SENSOR
64 ACCELERATION SPEED SENSOR
70 OUTPUT SUPPRESSION ARITHMETIC UNIT
71 TARGET ACCELERATOR POSITION CALCULATION UNIT
72 SLIP RATIO CALCULATION UNIT
73, 73a CORRECTION ACCELERATOR POSITION CALCULATION UNIT
73C, 73Ca INTEGRATION ARITHMETIC UNIT
74 SUBTRACTION UNIT

The invention claimed is:

1. A dump truck for traveling in a mine comprising:
an engine;
a vessel;
a plurality of drive wheels driven by the engine; and
an operation controller configured to execute first drive force control that brakes a slipping drive wheel out of the plurality of drive wheels and also configured to execute second drive force control that reduces output of the engine in accordance with a slip ratio of the slipping drive wheel during execution of the first drive force control,
wherein at a time of performing the second drive force control, the operation controller subtracts a correction accelerator position acquired in accordance with the slip ratio of the slipping drive wheel from a target accelerator position of an accelerator acquired in accordance with a target vehicle speed and an actual vehicle speed.

2. The dump truck according to claim 1, wherein the operation controller executes the second drive force control in a case where an actual vehicle speed of the dump truck is less than a first vehicle speed threshold and also a speed difference between the drive wheel and a driven wheel included in the dump truck is continuously kept at a speed difference threshold or more.

3. The dump truck according to claim 2, wherein the operation controller finishes the second drive force control currently executed in a case where the first drive force control is finished or the actual vehicle speed of the dump truck is equal to or more than a second vehicle speed threshold that is larger than the first vehicle speed threshold during execution of the second drive force control.

4. The dump truck according to claim 1, further comprising a communication device configured to communicate with outside of the dump truck,
wherein the operation controller obtains a target vehicle speed of the dump truck from the communication device, performs control such that the actual vehicle speed of the dump truck becomes the target vehicle speed.

5. A dump truck including an engine and a plurality of drive wheels driven by the engine, comprising:
a communication device configured to communicate with outside of the dump truck; and
an operation controller configured to obtain a target vehicle speed of the dump truck from the communication device and perform control such that an actual vehicle speed of the dump truck becomes the target vehicle speed,
wherein
the operation controller executes first drive force control that brakes a slipping drive wheel out of the plurality of drive wheels such that a slip ratio of the slipping drive wheel becomes a target value of the slip ratio of the drive wheel, and further executes second drive force control that reduces output of the engine in accordance with the slip ratio of the slipping drive wheel during execution of the first drive force control, and
at a time of performing the second drive force control, the operation controller subtracts a correction accelerator position acquired in accordance with the slip ratio of the slipping drive wheel from a target accelerator position of an accelerator acquired in accordance with the target vehicle speed and the actual vehicle speed.

6. A control method for a dump truck including an engine and a plurality of drive wheels driven by the engine, comprising:
acquiring slip ratios of the plurality of drive wheels;
executing drive force control that brakes a slipping drive wheel out of the plurality of drive wheels;
reducing output of the engine in accordance with a slip ratio of the slipping drive wheel in a case where a vehicle speed of the dump truck is less than a vehicle speed threshold and a speed difference between the drive wheel and a driven wheel included in the dump truck is continuously kept at a speed difference threshold or more during execution of the drive force control; and
subtracting a correction accelerator position acquired in accordance with the slip ratio of the slipping drive wheel from a target accelerator position of an accelerator acquired in accordance with a target vehicle speed and an actual vehicle speed.

* * * * *